Patented Feb. 16, 1937

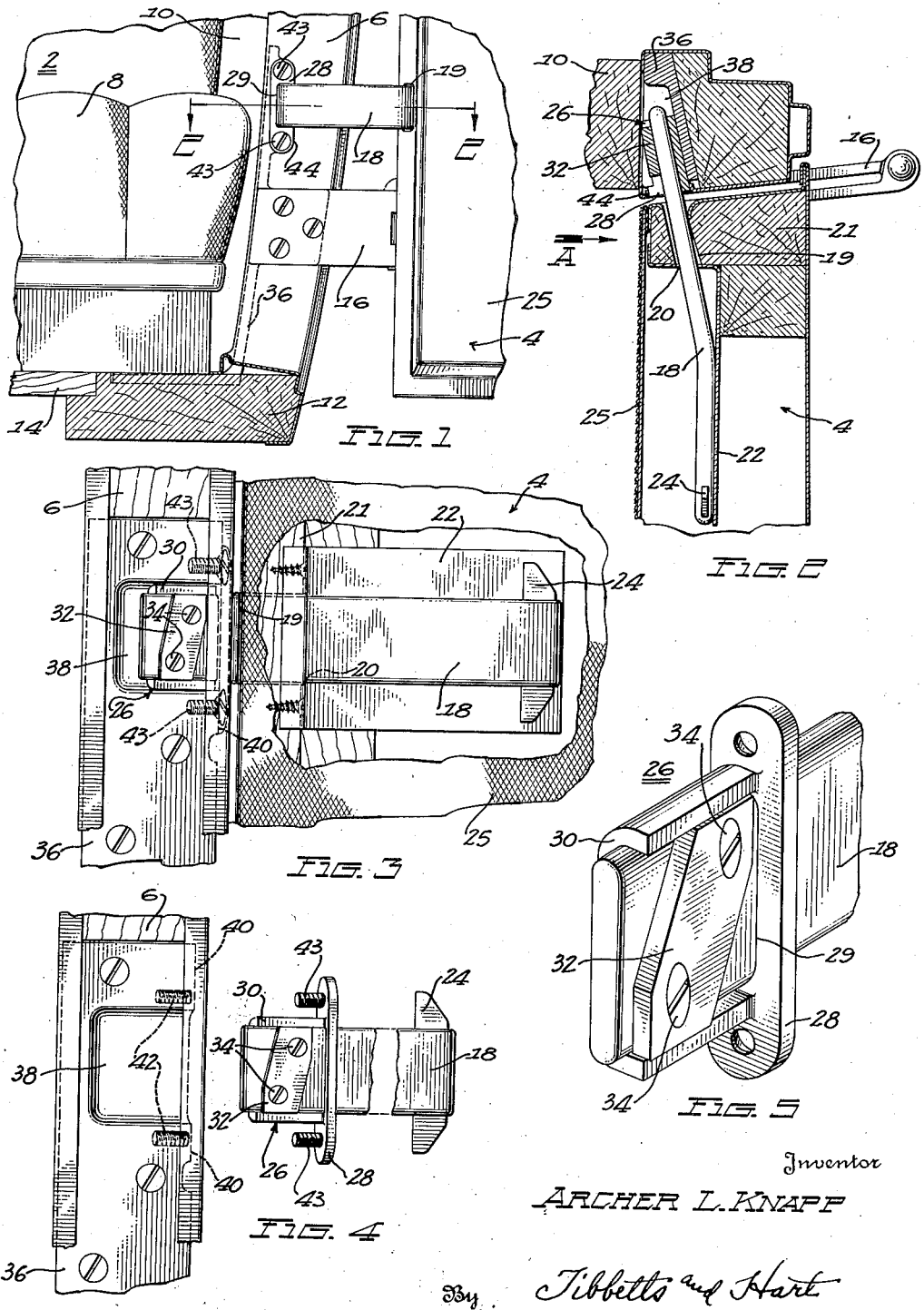

2,071,074

UNITED STATES PATENT OFFICE 2,071,074

CHECK HASP ANCHOR

Archer L. Knapp, Detroit, Mich., assignor to Packard Motor Car Company, Detroit, Mich., a corporation of Michigan Application March 11, 1935, Serial No. 10,355

9 Claims. (Cl. 16—82)

This invention relates to motor vehicles and more particularly to check straps for limiting the opening movements of the doors.

The check straps of motor vehicle doors are often broken by the force exerted by the doors as they are swung to open position. This is especially the case with doors which are hinged at their rear edges so that they open at the front. When such a door is partially opened during the forward movement of the vehicle, the air rushing past the vehicle frequently catches the door and swings it back with great force to its limiting open position.

The removal of the broken strap and the replacement thereof often is a rather difficult operation and requires considerable labor and time. Usually one end of the strap is secured to a fixed part of the body of the vehicle adjacent the door and the strap is arranged to move through an opening in the adjacent portion of the door frame, devices being provided for limiting the movement of the strap through the said opening. Frequently the securing devices for the fixed end of the strap are obstructed by certain parts of the vehicle so that access thereto can be had only with considerable difficulty.

One object of the present invention is to improve the construction of the devices for securing one end of a check strap to the body or to the door of a motor vehicle to facilitate the removal of the strap when broken and the replacement of the same by another strap.

Another object of the invention is to produce a novel and improved construction for securing one end of a check strap to a fixed part of a motor vehicle body or to a door which will hold said end of the strap securely and will enable the end of the strap to be detached and the end of a replacement strap to be attached quickly and easily.

With the above and other objects in view the invention consists in a construction embodying the novel and improved features hereinafter described and particularly pointed out in the claims, the advantages of which will be readily understood and appreciated by those skilled in the art.

The invention will be clearly understood from the accompanying drawing illustrating the invention in its preferred form and the following detailed description of the construction therein shown.

In the drawing Fig. 1 is a view partly in elevation and partly in vertical section of a portion of a motor vehicle having the invention applied thereto looking from the front of the vehicle with a door in open position.

Fig. 2 is a view in horizontal section taken substantially on the line 2—2 of Fig. 1 showing the door in closed position.

Fig. 3 is a detail view in elevation taken from the inside of the vehicle in the direction of the arrow A, Fig. 2 and illustrating particularly the construction of the check strap mechanism with certain parts removed and certain parts broken away to show the structure.

Fig. 4 is a detail view taken from the inside of the vehicle in the direction of the arrow A, Fig. 2 and illustrating particularly the check strap and the securing devices for securing one end of the check strap to the body, with the check strap detached from the body and Fig. 5 is a detail perspective view illustrating the check strap and certain of the devices for securing one end of said strap to the body.

The invention is shown in this application as applied to a motor vehicle comprising a body indicated as a whole at 2 and a door indicated at 4, hinged to said body. In the illustrated construction, the door 4 is the forward door on one side of the vehicle. The body comprises a side pillar 6 located between the forward and rear doors (the rear door not being shown) a seat 8, a member 10 located on the inner side of the pillar 6 and constituting part of the seat supporting frame, a side sill 12 and flooring 14.

The door 4 is hinged to the pillar 6 upon hinges, one only of which is shown, this hinge being indicated at 16. The door, when closed, is located substantially in the position shown in Fig. 2 with relation to the pillar 6, the rear edge of the door then being located in opposed relation to the forward face of said pillar. The door is provided with the usual inner panel 25 secured at its margin to the door frame as shown in Fig. 2.

The opening movement of the door is limited by means of a check strap 18. The check strap may be connected in various ways to the body and to the door. In the present construction, the check strap is arranged to slide through an opening in the frame of the door, its movement in an outward direction with relation to the door being limited by suitable stops and the rear end of the strap is fixedly secured to the pillar 6. The check strap is arranged to slide through suitable openings 19 and 20 formed respectively in the member 21 of the frame of the door 4 and in the stop plate 22 secured to said frame member and its outward movement with relation to the door through these openings is limited by a stop bar 24 secured in the forward end of the strap and arranged to engage the stop plate 22.

The rear end of the strap is secured to the pillar 6 so that it may be very quickly and easily attached to said pillar or removed therefrom. To this end a strap holding device indicated as a whole at 26 is secured to the rear end of the strap. This strap holding device comprises a securing plate 28 having an opening or slot 29 through which the end of the strap may be passed and a clamping portion attached to and projecting from said securing plate. This clamping portion comprises a recessed projection or channel 30 extending from one side of the plate 28 and arranged to receive the end of the strap as shown in Figs. 2 to 5 inclusive and a clamping plate 32 arranged to engage the outer face of the strap and secured to the channel 30 by means of screws 34 passing through the strap and threaded into the channel.

The end portion of the strap may be readily secured to or detached from the strap holding device 26. In removing the end portion of the strap from said holding device the screws 34 are unscrewed from the channel 30, the clamping plate 32 is removed from the strap and the strap is then withdrawn longitudinally from the channel and the plate 28. In applying the end portion of a strap to the holding device, the said end portion is passed through the opening in the plate 29 of said holding device and is engaged in the recess or groove in the channel 30 after which the clamping plate 32 is applied.

The pillar 6 comprises a brace 36 preferably made of metal extending along the inner face thereof. This brace is provided with a recess or socket 38 within which the channel 30 with the end of the check strap and the clamping plate 32 attached thereto are arranged to engage as shown clearly in Figs. 2 and 3. Said brace is further provided with surfaces 40 located respectively above and below the recess 38 to receive the projecting upper and lower portions of the plate 28 and with openings 42 to receive securing screws 43 passed through said projecting portions of the plate. The portion of the pillar 6 forwardly of the brace 36 is provided with an opening 44 leading to the socket 38 through which the channel 30 and the attached parts may be inserted from the forward side of the pillar.

With the present construction, upon the breaking of a check strap, the portions of the broken strap may be removed from the door and the pillar 6 and a replacement strap may be applied to these parts and secured in position with the expenditure of comparatively little labor and time. In removing the portion of the broken strap attached to the pillar, the screws 43 are unscrewed from the brace 36 and the strap holder 26 is removed from the pillar 6 by a forward movement thereof longitudinally of the strap to disengage the plate 28 from the opening 44 in the pillar and to disengage the channel 30 from the socket 38. Upon detaching the clamping plate 32 the broken end of the strap may be readily removed from the strap holding device 26. In removing the portion of the broken strap attached to the door, it will be necessary to detach a portion of the margin of the panel 25 from the door frame adjacent the strap. The workman then reaches in through the opening thus formed and withdraws the said portion of the broken strap from the openings in the frame member 21 and stop plate 22. A replacement strap is then passed through these openings so that its rear end portion projects rearwardly from the door frame and the strap holding device 26 is applied to the rear end thereof in the manner above described. The strap holding device with the end portion of the strap attached thereto is then applied to the pillar 6 by locating the holding device and strap in a position similar to that shown in Fig. 4 and then moving the same rearwardly longitudinally of the strap to engage the channel 30 in the socket 38 and to engage the plate 28 in the opening 44. The holding device is then securely attached to the pillar 6 by threading the screws 43 into the openings 42 in the brace 36.

The holding device for the rear end of the check strap, when secured in position, is entirely unobstructed by any other parts of the vehicle structure. With this construction, the removal of the rear end of a strap from or the attachment of said end of a strap to the pillar 6 does not require any other parts of the body structure to be removed or disturbed. The screws 43 are rendered accessible by the swinging of the door to open position.

Although the invention has been shown and described as embodied in a particular construction it is to be understood that this construction is merely illustrative of the invention and that the invention is not limited thereto but may be embodied in other forms within the scope of the claims.

Having explained the nature and object of the invention and having specifically described a construction embodying the invention in its preferred form what is claimed is:

1. A door check strap holding device for motor vehicles comprising an attaching plate, a channel to receive the strap attached to and projecting from one side of said plate, a clamping plate for clamping the strap to the channel and means for removably securing the clamping plate to the channel to hold the strap.

2. In a body construction for motor vehicles having a recessed pillar and a door check strap, strap anchoring means comprising a holder having a strap holding portion arranged to fit in said recess and insertable therein after the holder has been attached to the strap, means fixing the strap to the holder portion, and means for removably securing the holder to said pillar with the strap holding portion engaged in said recess.

3. In a body construction for motor vehicles having a recessed pillar and a door check strap, strap anchoring means comprising a holder for one end of said strap having a securing portion and a strap clamp projecting therefrom and arranged to fit in said recess and insertable therein after the holder has been attached to the strap and means for removably securing the holder to the pillar with the strap clamp engaged in said recess.

4. In a body construction for motor vehicles having a recessed pillar and a check strap, strap anchoring means comprising a holder for one end of the strap having a channel portion arranged to fit in said recess and insertable in and removable from the recess by a movement of the strap holder in a direction longitudinally of the strap, means fixing the strap to said channel, and means for removably securing the strap holder to said pillar with the channel engaged in said recess.

5. In a body construction for motor vehicles having a recessed pillar and a door check strap, strap anchoring means comprising a holder having a portion to which one end of the strap is fixed, said holder portion being arranged to fit in said recess and constructed to be inserted in and removed from said recess while the other parts of the vehicle remain in normal assembled relation and means for removably securing the holder to said pillar with the strap holding portion engaged in said recess.

6. In a body construction for motor vehicles having a recessed pillar and a door check strap, strap anchoring means comprising a holder for one end of the strap having a portion arranged to engage in said recess and insertable in and removable from the recess from the side of said pillar adjacent the door, means fixing the strap end to the holder portion, and means for securing said holder removably to said pillar from the latter side thereof.

7. In a vehicle body structure having a recessed door pillar and a door check strap, strap anchoring means comprising a holding device having an apertured plate adapted to overlie the pillar recess and a channel extending from the securing plate adapted to lie within the pillar recess, said plate aperture and said channel being in aligned relation to receive one end of said strap, a clamping plate in said channel secured to the strap end to prevent displacement of the strap end through the aperture in the securing plate, and removable means fastening said securing plate to the pillar over the recess therein.

8. In a vehicle body structure having a recessed door pillar and a door check strap, strap anchoring means comprising a securing plate adapted to overlie the pillar recess, said plate having an aperture therein through which one end of the strap can be inserted, means detachably fastening said securing plate to the pillar and over the recess therein, and clamping means detachably securing the strap end to said securing plate to prevent displacement of the strap through the aperture in the securing plate.

9. In a vehicle body structure having a recessed door pillar and a door check strap, strap anchoring means comprising a holder adapted to overlie the pillar recess, said holder having an aperture therethrough for receiving one end of the check strap, means detachably fastening said holder against the pillar with the aperture aligning with the recess, and means fixing said strap to said holder for preventing displacement of said strap through the aperture in said holder.

ARCHER L. KNAPP.